J. H. BURT.
FISHING REEL.
APPLICATION FILED SEPT. 26, 1917.

1,271,429.

Patented July 2, 1918.

Inventor
J. H. Burt

By E. Hine/albert
Attorney

UNITED STATES PATENT OFFICE.

JAMES H. BURT, OF KOKOMO, INDIANA, ASSIGNOR OF ONE-HALF TO CHARLES H. LEER, OF KOKOMO, INDIANA.

FISHING-REEL.

1,271,429.  Specification of Letters Patent.  Patented July 2, 1918.

Application filed September 26, 1917. Serial No. 193,301.

*To all whom it may concern:*

Be it known that I, JAMES H. BURT, a citizen of the United States, residing at Kokomo, in the county of Howard and State of Indiana, have invented new and useful Improvements in Fishing-Reels, of which the following is a specification.

This invention has reference generally to improvements in that class of inventions known as fishing and trapping and more particularly relates to a fishing reel.

As the primary aim and object this invention contemplates the provision of a device of the above character wherein the construction thereof permits of the casting of the line and the subsequent locking of the reel against rotation to consequently prevent retrograde winding of the line on the reel.

It is an equally important object of this invention to provide a fishing reel of the character described wherein improved trip means is employed for removably holding the locking pawl out of engagement with the ratchet on the shaft and thus control the action of the line and the drum.

More particularly the present invention embraces the provision of a reel of the character mentioned composed of a minimum number of parts arranged to coöperate with each other so as to increase the efficiency of the operation of the reel in general.

Among the other aims and objects of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Similar characters of reference are employed in all of the above views, to indicate corresponding parts.

Figure 1:
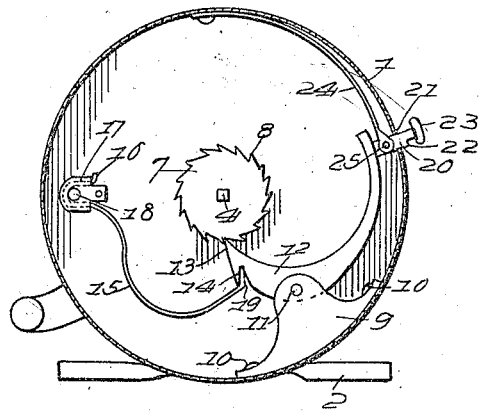
Figure 1 is an end elevation of the invention showing the drum locked against movement.
Figure 2:
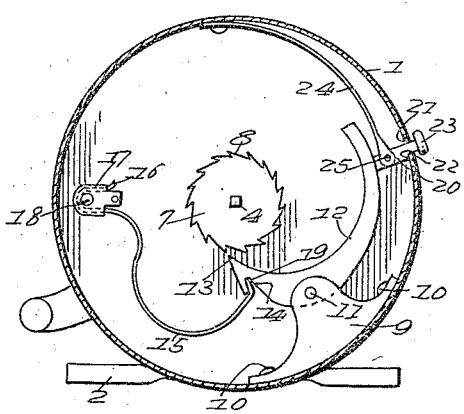
Fig. 2 is a similar view showing the drum in a position to freely rotate.
Figure 3:
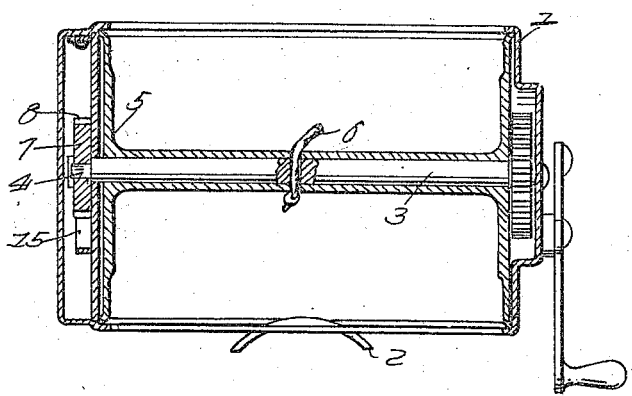
Fig. 3 is a longitudinal section of the invention.
Figure 4:
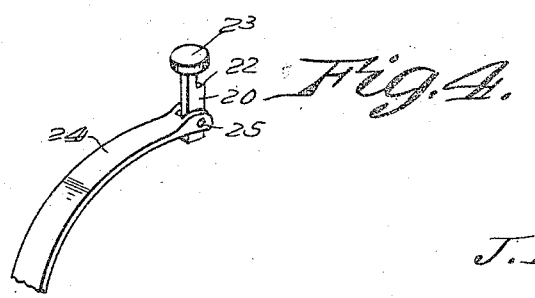
Fig. 4 is a perspective detail of the trip.

Referring now, more particularly, to the accompanying drawings, there is provided an open cylindrical casing or frame 1 formed with attaching arms 2 adapted to be connected in a convenient manner to a rod (not shown). A shaft 3 is journaled in the ends of the casing 1 and has one projecting extremity square as at 4. A drum 5 is carried by the shaft within the casing and has a line 6 connected thereto and windable thereabout upon the actuation of a handle connected to the opposite projecting end of the shaft.

In order to prevent retrograde winding of the line 6 on the drum a ratchet wheel 7 is mounted on the square end 4 of the shaft 3 and is formed with teeth 8 on the periphery thereof. Spaced ears 9 are secured by fasteners 10 to the inner surface of the casing while pivotally mounted therebetween through the instrumentality of a pivot pin 11 is a pawl 12, the said pin passing through the pawl approximately midway the ends thereof. This pawl is formed near its engaging end 13 with a notch 14 for a purpose that will presently appear. A leaf spring 15 is now employed and has one end curved as at 16 and rigidly secured to the inner surface of the casing by means of a cap or clip 17 which in turn is secured to the casing by a fastening device 18. The outer end of the spring is formed with a nib 19 seated in the notch 14, the tension of the spring serving to hold the engaging end 13 of the pawl in engagement with any one of the teeth 8 of the ratchet wheel 7.

With a view toward providing the improved means for controlling the position of the pawl there is employed a trip 20 which operates in a slot 21 in the casing. This trip consists of a body reduced to form a shoulder 22 while a push button or knob 23 is formed on the outer end of the reduced portion. A leaf spring 24 has one end secured to the inner surface of the casing and its opposite end bifurcated and pivoted by a pin 25 to the body of the trip 20 and normally holds the major portion of the trip exteriorly of the casing so that the spring 15 will hold the pawl in engagement with the ratchet wheel but upon pressing the button or knob 23 against the tension of the spring 24 the inner end of the pawl will be engaged by the trip to consequently move the engaging end 13 of the pawl out of engagement with the ratchet and against the tension of the spring while the trip is manipulated to position the shoulder against the inner surface of the casing so as to hold the parts in the position just described and permit of the casting of the line.

It is believed in view of the foregoing description that a further detailed description of the operation of the invention is entirely unnecessary. Likewise, it is thought that the advantages of the invention will be clearly apparent.

As many changes could be made in the above construction and many apparent widely different embodiments of this invention could be made without departing from the scope thereof, it is intended that all matter contained in the above description or shown in the accompanying drawings shall be interpreted as illustrative and not in a limited sense.

Having thus fully described this invention, what is claimed as new and desired to be secured by Letters-Patent, is:—

A fishing reel of the character described including an open casing formed with a slot, a shaft journaled in the casing, a drum on the shaft, a ratchet wheel on the shaft, a pawl pivotally mounted in the casing, a leaf spring connected to the casing to assure of the yielding retention of the pawl in engagement with any one of the teeth of the ratchet wheel, a trip positioned in the slot and near the inner end of the pawl and embodying a body reduced to form a shoulder and a knob on the reduced outer end of the body and positioned exteriorly of the casing and another leaf spring secured at its inner end to the casing and normally arranged against the inner surface of the casing and having its outer end bifurcated and pivotally secured to the body of the trip for yieldingly holding the latter partially exteriorly of the casing but adapted to be moved when the knob is depressed and manipulated to position the shoulder against the inner surface of the casing and force the body of the trip against the inner end of the pawl whereby to move and hold the pawl out of engagement with the ratchet wheel.

In testimony whereof I affix my signature.

JAMES H. BURT.